United States Patent
Chapman et al.

(10) Patent No.: US 7,089,115 B2
(45) Date of Patent: Aug. 8, 2006

(54) ROAD WEATHER PREDICTION SYSTEM AND METHOD

(75) Inventors: Lee Chapman, Birmingham (GB); John Edward Thornes, Worcestershire (GB)

(73) Assignee: Entice Technology Limited, Birmingham (GB)

( * ) Notice: Subject to any disclaimer, the term of this patent is extended or adjusted under 35 U.S.C. 154(b) by 138 days.

(21) Appl. No.: 10/485,430

(22) PCT Filed: Jul. 31, 2002

(86) PCT No.: PCT/GB02/03521

§ 371 (c)(1),
(2), (4) Date: Aug. 16, 2004

(87) PCT Pub. No.: WO03/012485

PCT Pub. Date: Feb. 13, 2003

(65) Prior Publication Data

US 2005/0010365 A1  Jan. 13, 2005

(30) Foreign Application Priority Data

Aug. 2, 2001  (GB) ................................. 0118853.1

(51) Int. Cl.
*G01W 1/00* (2006.01)
(52) U.S. Cl. ............................................................ 702/3
(58) Field of Classification Search ................ 702/2, 702/3, 4, 5
See application file for complete search history.

(56) References Cited

U.S. PATENT DOCUMENTS 5,675,081 A   10/1997 Solheim et al. .......... 73/170.28
6,085,152 A * 7/2000 Doerfel ........................ 702/3
6,990,410 B1 * 1/2006 Boright et al. ................ 702/3

FOREIGN PATENT DOCUMENTS

| JP | 09114371 | 5/1997 |
| JP | 11064536 | 3/1999 |
| JP | 2001051069 | 2/2001 |

OTHER PUBLICATIONS

XP-002240949; Site-specific Road Condition Forecast for Maintenance Services; J. Heierli; pp. 1-6.

(Continued)

*Primary Examiner*—Donald McElheny, Jr.
(74) *Attorney, Agent, or Firm*—Wells St. John P.S.

(57) ABSTRACT

In one aspect, the present invention relates to a method of determining the sky-view factor at a location. The method comprises the steps of receiving data from at least one global positioning satellite at the location, and comparing the data so obtained with a mathematical function. The function is derived from corresponding data obtained from reference locations at which the sky view factor is known, whereby to arrive at an approximation of the sky view factor at said location. In another aspect, the invention relates to a method for predicting the variation in temperatures over time at locations along a survey route, particularly a road network. The method comprises the steps of establishing a database for the survey route containing location specific geographical parameters, obtaining actual and forecast meteorological data and separately predicting the temperature at each location using energy balance equations. The predicted temperature calculated for each location is dependent upon the meteorological data and the geographical parameters for the location whose temperature is being predicted. The invention also discloses systems which relate to the above methods.

21 Claims, 12 Drawing Sheets

OTHER PUBLICATIONS

XP-002221537; Rapid determination of canyon geometry parameters for use in surface radiation budgets; L. Chapman et al.; pp. 81-89.

XP-002221538; Sky view factors in forest canopies calculated with IDRISI; B. Holmer et al.; PP. 33-40.

XP-002221539; Statistical modelling of road surface temperature from a geographical parameter database; Lee Chapman et al.; pp. 1-20.

XP-002240950; Sound Basis for Road Condition Monitoring; A. Giles, B.Sc.; pp. 28-29.

* cited by examiner

Urban

Surburban

Rural (leaves on)

Rural (leaves off)

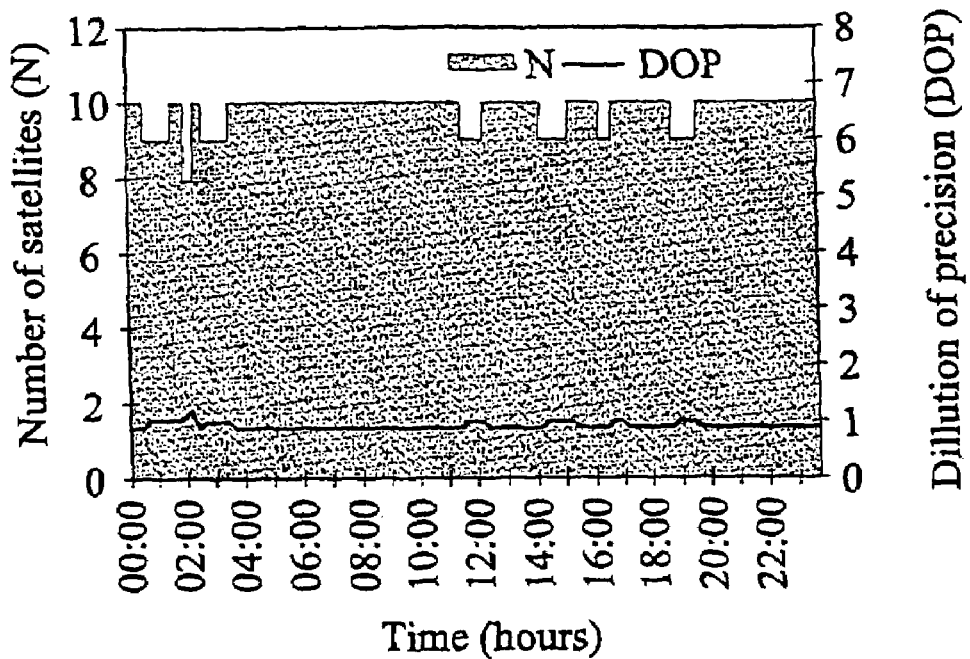
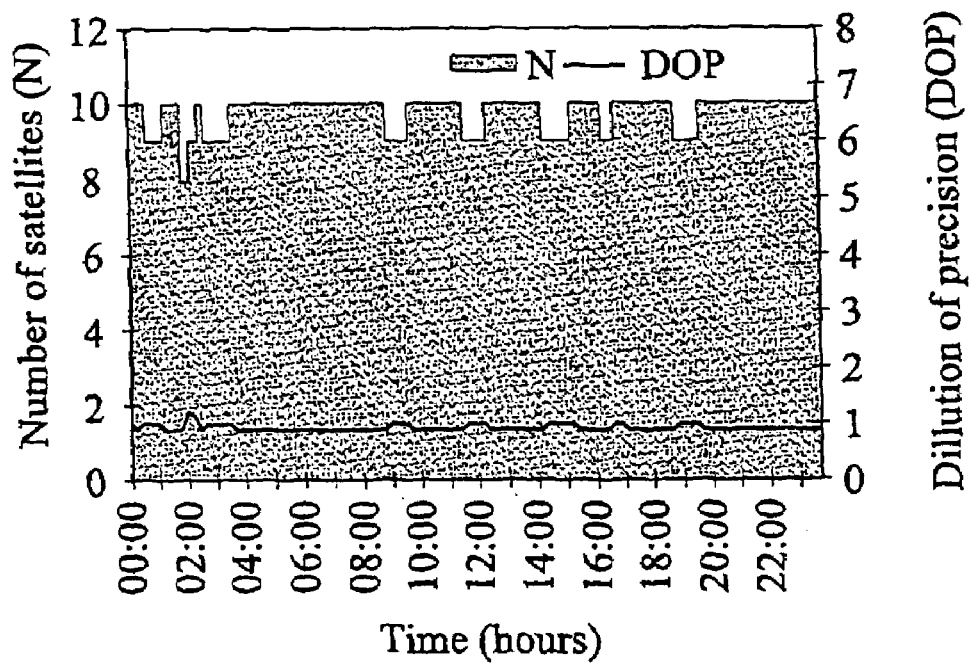
FIG 9ᵃ

Direct and diffuse radiation

Diffuse radiation only

ROAD WEATHER PREDICTION SYSTEM AND METHOD

CROSS REFERENCE TO RELATED APPLICATION

This application is a 35 U.S.C. §371 of and claims priority to PCT International Application Number PCT/GB02/03521, which was filed 31 Jul. 2002, and was published in English which was based on GB Patent Application No. 0118853.1 which was filed 02 Aug. 2001 and the teachings of which are incorporated herein by reference.

The present invention relates in a first aspect to a method of measuring sky view factors and an apparatus for carrying out the method.

The sky-view factor ($\psi$s) is a major control on the quantity of longwave radiation released from surface elements into the sky hemisphere. Quoted simply as a value between zero and one, $\psi$s is a dimensionless parameterisation of the quantity of visible sky at a location, with unity representing maximum sky visibility.

$\psi$s has a particularly important role in the nocturnal radiation budget. Surface geometry prevents the loss of longwave radiation from the ground, leading to increased air and surface temperatures at locations with low $\psi$s. The relationship between $\psi$s and temperature is so strong that $\psi$s is considered to be the dominant factor in causing the urban heat island phenomenon. Measurement of $\psi$s is important for modelling the thermal fingerprints of road and rail surfaces (amount and rate of heating and cooling), which in turn provides useful information on likely patterns of surface deterioration and more importantly ice prediction. On marginal nights where the temperature hovers around freezing, there is a large economic benefit in knowing which particular sections of the highway are colder and likely to freeze. For example, city centres (low $\psi$s) are much warmer than rural areas and as such do not require as much salting. Experiments show that the sky-view factor is the dominant parameter controlling nocturnal road surface temperature and is crucial for ice prediction. There is clearly a commercial benefit for highway and railway maintenance authorities if $\psi$s can be determined quickly and cheaply with a reasonable degree of accuracy. In such applications, where a large number of $\psi$s values are required, the locations possibly being spread over a wide area, speed and cost may be more significant than absolute accuracy.

Research into the impact of $\psi$s has been hampered by the slow and difficult task of acquiring reliable data. Referring to FIG. 1, recent approaches have favoured the calculation of $\psi$s from imagery, in particular fish-eye photographs which show the intrusions of trees and buildings into the hemispherical field of view. Many calculation techniques have been developed to derive $\psi$s from such images. These techniques are generally digitally based, but can still be time consuming due to a need for post-processing, which makes them unsuitable for field estimates. Such techniques are also problematic as processing requires imagery to be taken in homogeneous overcast conditions (usually at dusk).

Hence, in order to measure $\psi$s in real time, the use of proxy data instead of direct calculation can prove advantageous. Postgard & Nunez (PhD thesis, University of Gothenberg, Sweden) achieved 81% explanation of $\psi$s variation by measuring longwave radiation in real time with an infrared camera placed over a highly polished hemisphere of stainless steel.

An object of the present invention is to provide an alternative method of approximating the sky view factor at a location which is preferably simple, rapid and inexpensive. A further object of the present invention is to provide a system for implementing the method.

The current approach used for ice prediction for a road network is built around road weather information systems (RWIS). Forecasts are obtained from automatic weather stations strategically placed around the highway network. These record and monitor meteorological parameters including road surface temperature (RST), air temperature, barometric pressure, precipitation, dew point, wind speed and wind direction. The data is transferred to a master station computer where it is combined with regional weather information in a road weather prediction model. The models are usually based on simple one-dimensional energy balance equations. These road weather models only produce forecast curves for the outstation from which the data was obtained. The RWIS then uses thermal mapping to project this forecast around the road network.

It is a yet further object of the present invention to provide a method and system for predicting the variation in surface temperatures over time at locations along a survey route which obviates the need for thermal mapping.

According to a first aspect of the present invention, there is provided a method of determining the sky-view factor at a location, comprising the steps of:

(i) receiving data from at least one global positioning satellite at said location, and (ii) comparing the data so obtained with a mathematical function derived from corresponding data obtained from reference locations at which the sky view factor is known, whereby to arrive at an approximation of the sky view factor at said location.

Also in accordance with the present invention is a system for generating an approximate sky view factor at a location, said system comprising:

(i) data receiving means for receiving data from GPS satellites, (ii) data storage means, and (iii) a processor, wherein the data storage means holds a pre-defined mathematical function relating GPS satellite data at a location to the approximate sky view factor at that location, and in use, satellite data received by the data receiving means is transferred to the processor where a sky view factor for that location is calculated from said mathematical function.

The GPS (global positioning satellite) system was developed in the early 1960's by NASA and the U.S Military. GPS is mostly used for high precision positioning and navigation, achieved by the triangulation of time and distance data from a sample of the 24 orbiting satellites in the GPS system. Satellite data is termed "pseudorange" and is a measure of the distance from the satellite to the receiver, plus correction data to account for clock errors, multipath (reflection and scattering from the surface) and the slowing of the signal through the ionosphere and troposphere as a result of atmospheric conditions. To achieve a reliable 2D positional fix, a minimum of three pseudoranges is required. Add a fourth satellite and it is possible to obtain a 3D fix (i.e. altitude can also be considered). Overall fix accuracy improves as more pseudoranges are used for triangulation. In theory a location can be pinpointed to within centimeters, though due to the military roots of GPS this true potential is rarely achieved in the public domain. This is due to data degradation in a process called selective availability, which can introduce positional inaccuracies of up to 30 metres.

Many modern GPS receivers display the number of pseudoranges being used for triangulation, (hereinafter referred to as N), in addition to the dilution of precision (DOP); a measure of the accuracy of the positional solution achieved from the available satellite ensemble. DOP is calculated from matrices generated by the available pseudoranges and is scored on a scale of one to ten. Lower DOP values are representative of higher quality data and usually occur when satellites are positioned close together in the field of view.

A GPS receiver may also indicate the signal strength (signal to noise ratios rated between 1 [weak signal] and 10 [strong signal]) for each of the satellites in view. A parameter hereinafter referred to as the satellite status index (SSI) is the sum of these signal strengths.

The satellite data may be selected from one or more of (i) the number of satellites in line of sight at said location (N), (ii) the sum of signal strengths of the or each satellite (SSI), and (iii) the dilution of precision value (DOP) at said location.

Preferably, the mathematical function is obtained by plotting for each reference location the actual sky view factor against the satellite data corresponding to that to be received for the location whose sky view factor is to be determined, and fitting a curve through the plots, the mathematical function corresponding to the equation of the fitted curve.

It will be understood that entering the received data for any given location into the mathematical function will generate a value corresponding to the approximate sky view factor at that location.

Preferably, said reference locations are selected to be of a similar type to the location whose sky view factor is being determined. More preferably, locations are defined as urban (buildings only in view), suburban (buildings and trees), rural (leaves on) or rural (leaves off).

Thus, the method preferably includes an initial step of receiving data from a user on the type of location at which the sky view factor is being determined, the mathematical function being derived only from reference locations of that same type.

As an alternative, data on the type of location at which the sky view factor is being determined is received from a database. Said database may be created from a satellite image (eg. by a supervised classification of land use). Preferably, said system comprises such a database.

It will therefore be understood that the data storage means of the system in accordance with the present invention preferably holds a mathematical function for each type of location.

The system also preferably comprises output means such as a visual display and/or printer for outputting the calculated sky view factor. Alternatively, or in addition, the calculated sky view factor may be stored on the data storage means, in which case the output means comprises a data bus for transmitting the calculated sky view factor to an external system.

The system may comprise a standard GPS receiver unit linked to a computer. Alternatively the system may be integrated into a single, preferably hand-held, unit.

The present invention further resides in a carrier medium carrying computer readable code for controlling a computer to carry out the method of the first aspect of the present invention.

Preferably, the carrier medium is a storage medium, such as a floppy disk, CD-ROM, DVD or a computer hard drive. Although it will be understood that the carrier medium may also be a transient carrier eg. an electrical or optical signal.

According to a second aspect of the present invention, there is provided a method for predicting the variation in temperatures over time at locations along a survey route, said method comprising the steps of:
(i) establishing a database for said survey route containing location specific geographical parameters,
(ii) obtaining actual and forecast meteorological data and
(ii) separately predicting the temperature at each location using energy balance equations, wherein said predicted temperature calculated for each location is dependent upon the meteorological data and the geographical parameters for the location whose temperature is being predicted.

The second aspect of the present invention also resides in a system for predicting temperatures at locations along a survey route, said system comprising:
(i) data storage means containing actual and forecast meteorological data, location specific geographical parameters and pre-defined energy balance equations,
(ii) means for determining the sky view factor at locations along the survey route, and
(iii) a processor for calculating the predicted temperature at each location on the survey route based on the meteorological data, sky view factor and location specific parameters input into the energy balance equations.

Preferably, the variations in temperature being predicted are road surface temperatures, in which case said meteorological data includes road surface temperature. However, it will be understood that the system and method are applicable for any survey route, eg. a rail network.

Preferably, said meteorological data includes one or more of air temperature, dew-point, precipitation (i.e. snowfall, rainfall etc.), cloud cover, cloud type and windspeed. Clearly, a larger number of meteorological parameters being considered potentially results in a more accurate prediction system. Thus, said meteorological data more preferably includes all the immediately preceding data.

It will be understood that said meteorological data is preferably obtained for a location on or relatively close to the survey route.

Preferably, said geographical parameters contained in said database are selected from latitude, longitude, altitude, an empirically derived cold air pooling index, sky view factor, screening, surface construction and landuse. More preferably, said database comprises the parameters latitude, longitude, altitude, the empirically derived cold air pooling index, sky view factor, surface construction and landuse, and optionally screening.

The second aspect of the present invention further resides in a carrier medium carrying computer readable code for controlling a computer to carry out one or more method steps of the second aspect of the present invention.

Embodiments of the invention will now be described by way of example only, with reference to the accompanying drawings in which.

Figure 3:
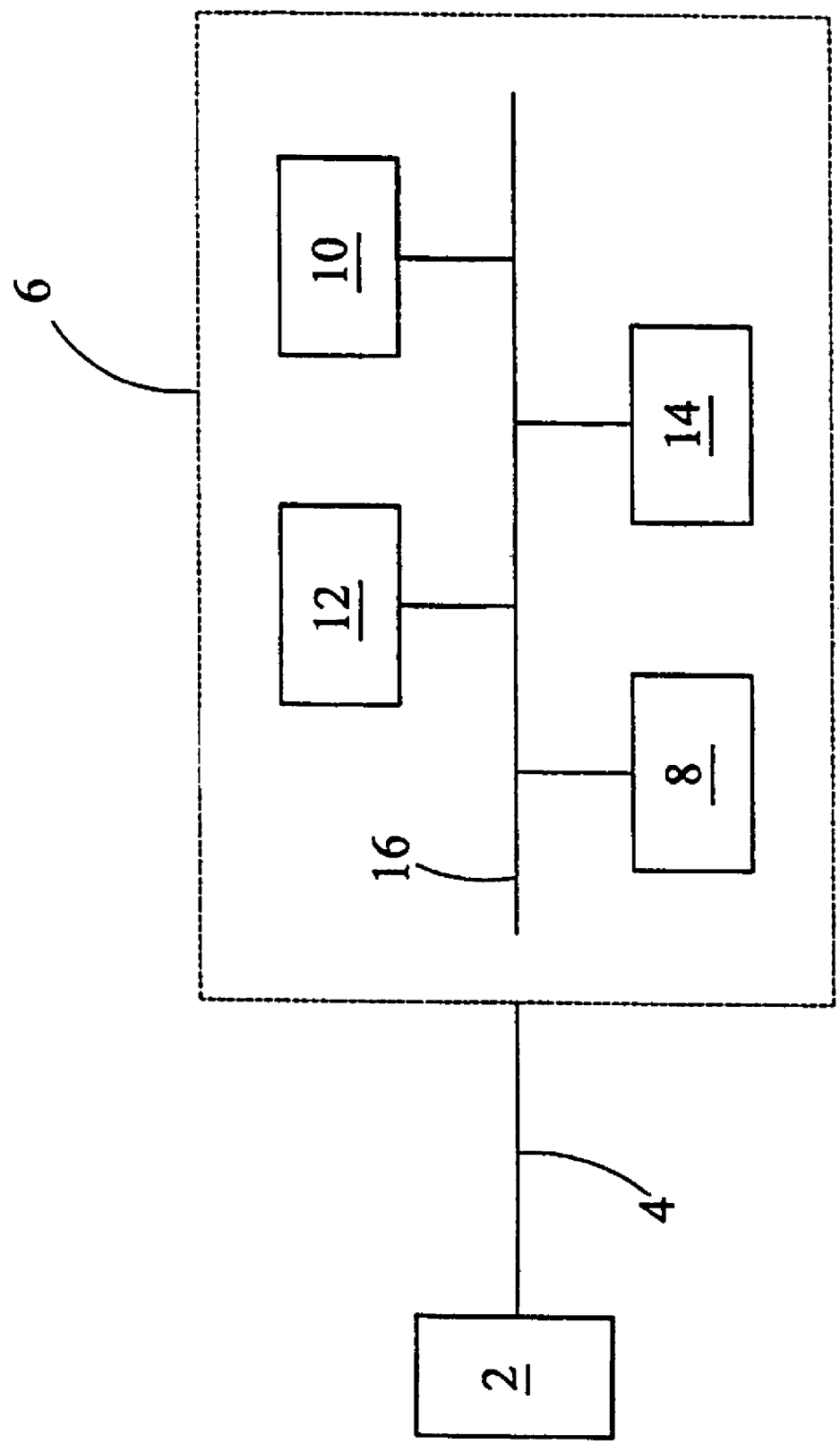
Figure 4:
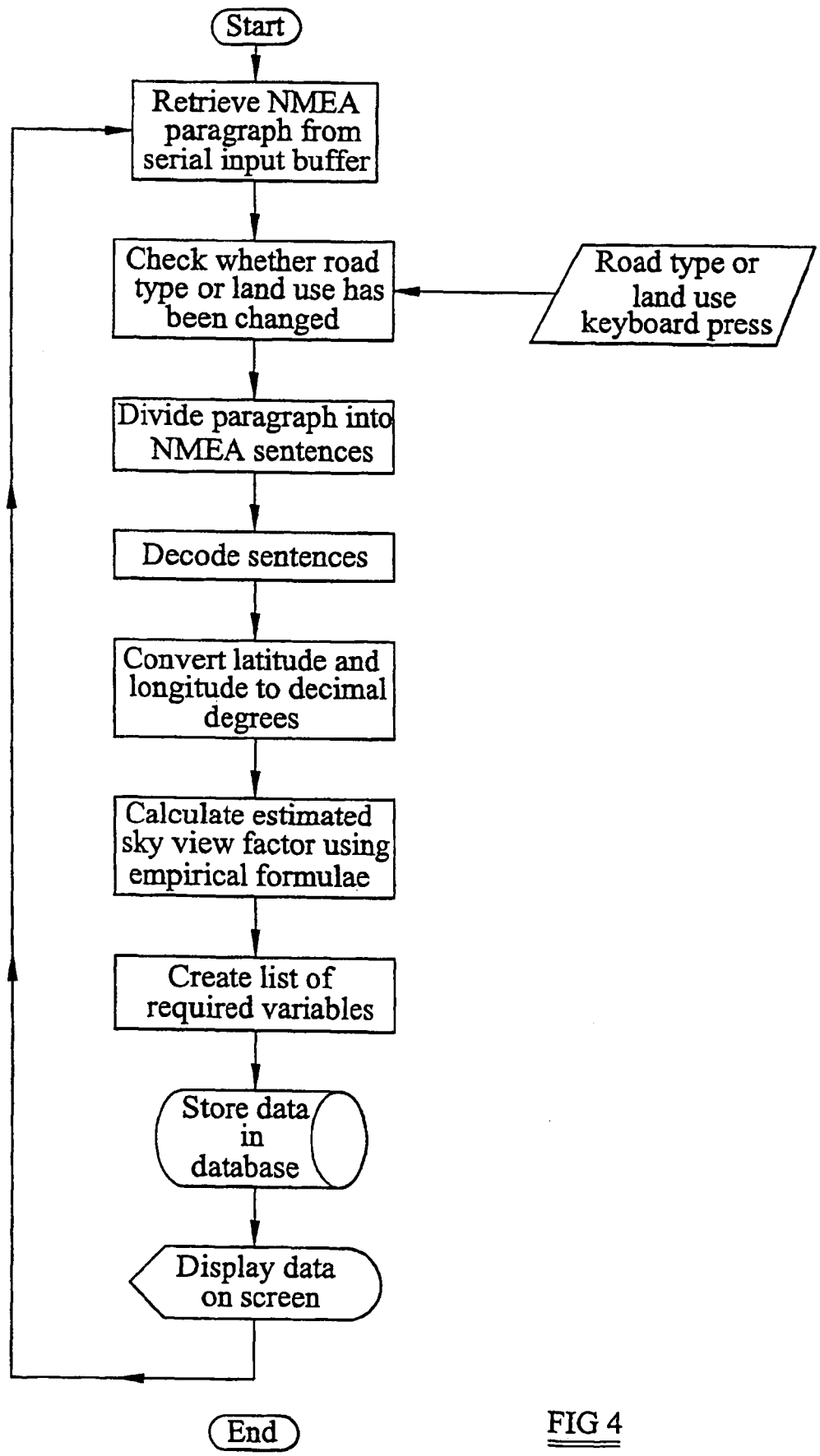
Figure 9:
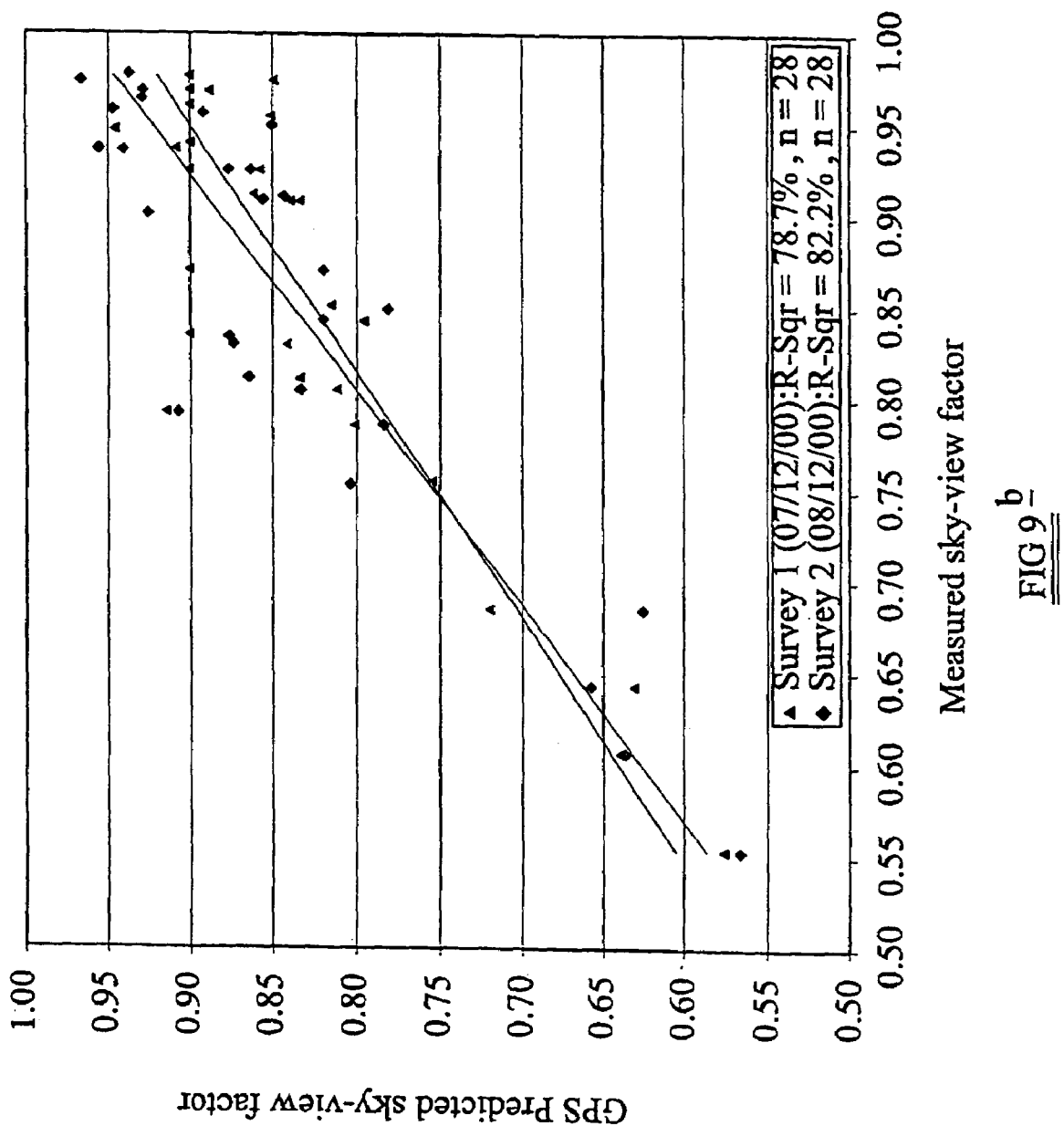
Figure 10:
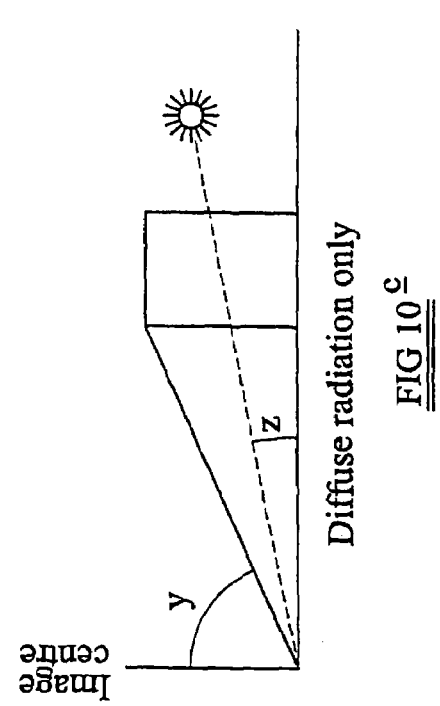
Figure 10:
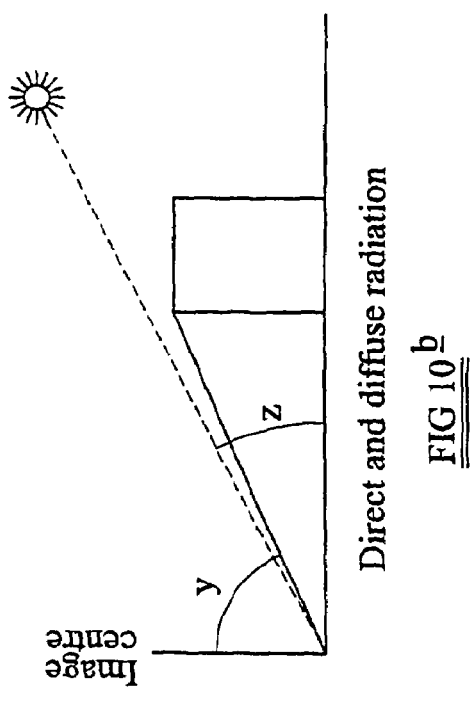
Figure 10:
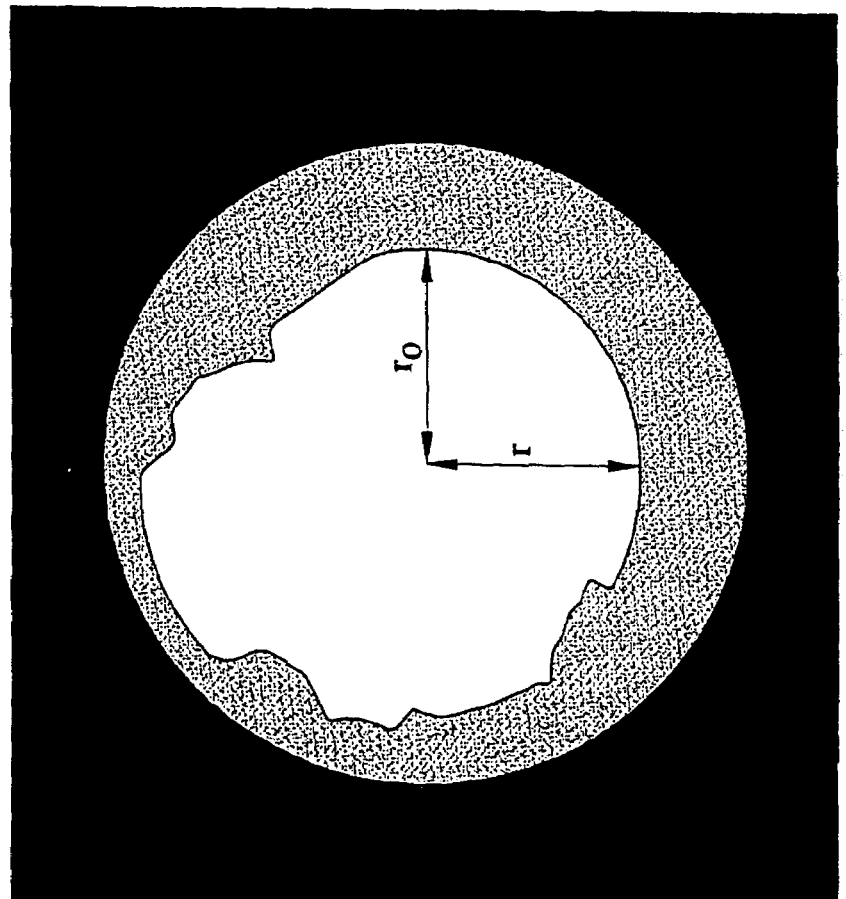
Figure 11:
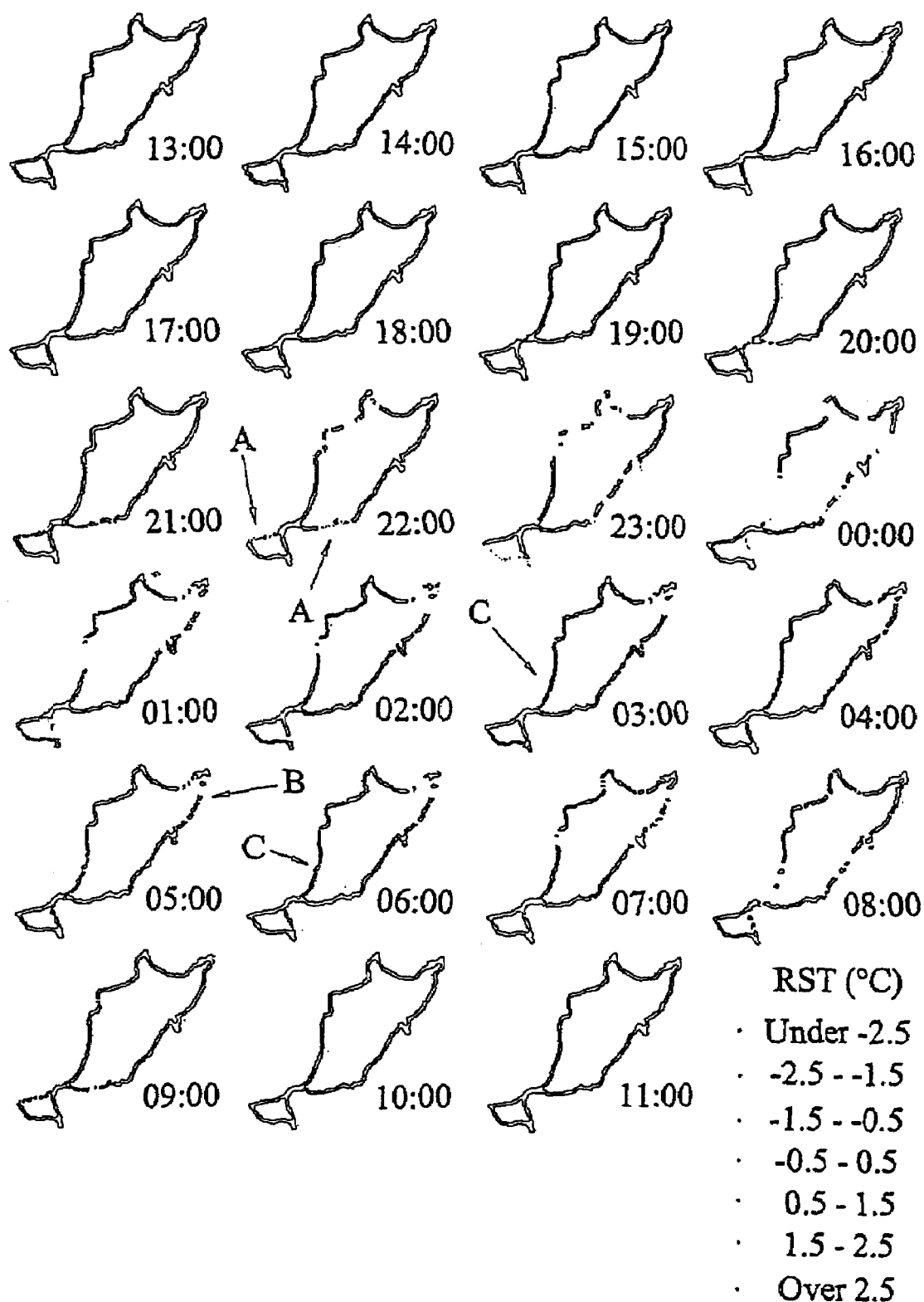
Figure 12:
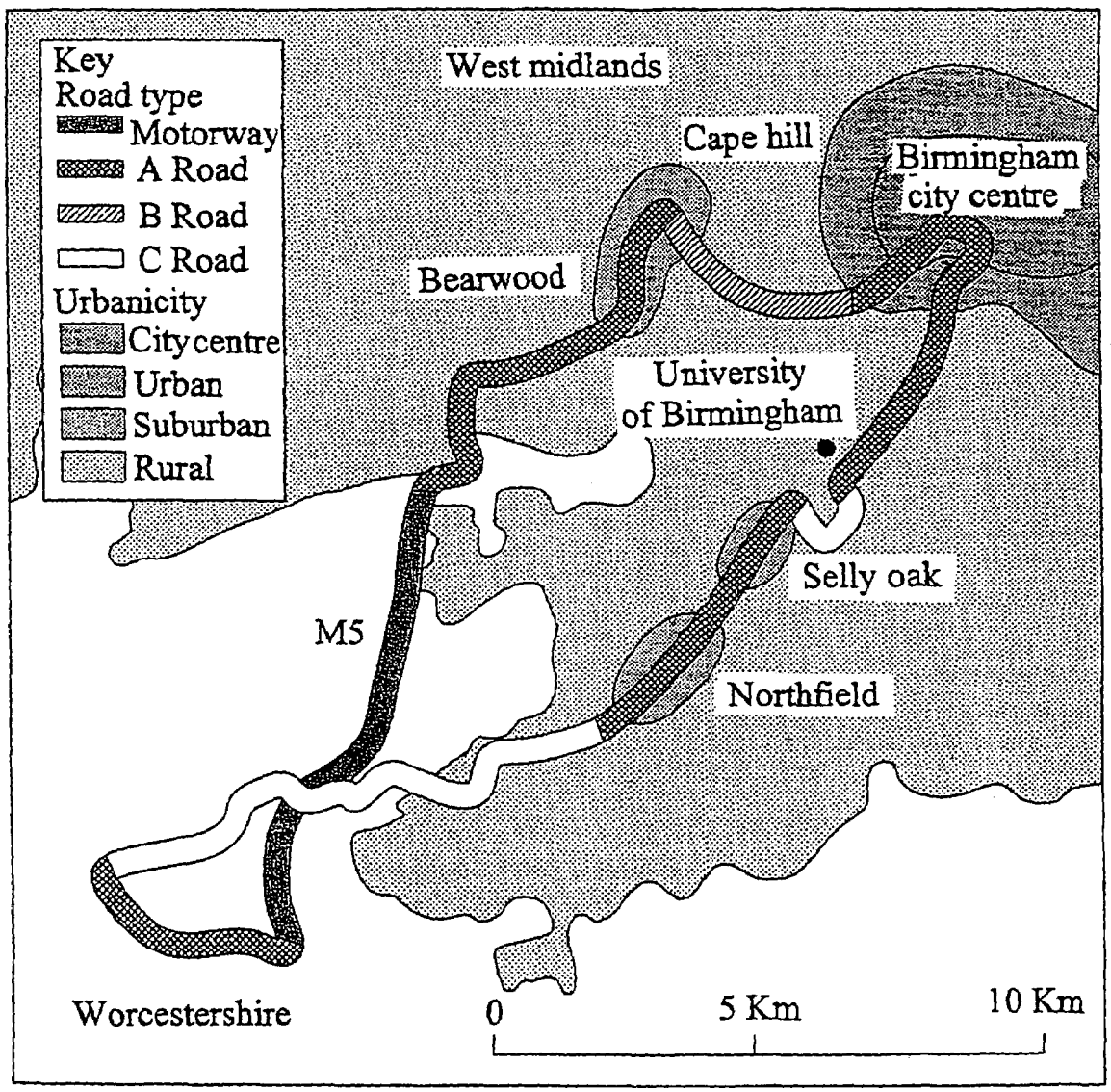

FIG. 3 is a schematic representation of a system in accordance with the present invention, FIG. 4 is a software conceptual flowchart, FIGS. 5 to 8 are graphs showing the relationship of N, DOP and SSI at different urban, suburban, rural (leaves on) and rural (leaves off) locations, FIG. 9a is a plot of GPS almanac data showing N and DOP for two consecutive survey days, FIG. 9b is a scatterplot of measured ψs against predicted ψs calculated from multiple regression analyses, data corrected with respect to the almanac data shown in FIG. 9a, FIGS. 10a–c schematically show screening at a location, FIG. 11 shows calculated temperatures over a survey route in a 24 hour period, and FIG. 12 is a route map showing road type and landuse for the route from which FIG. 11 is derived.

Figure 1:
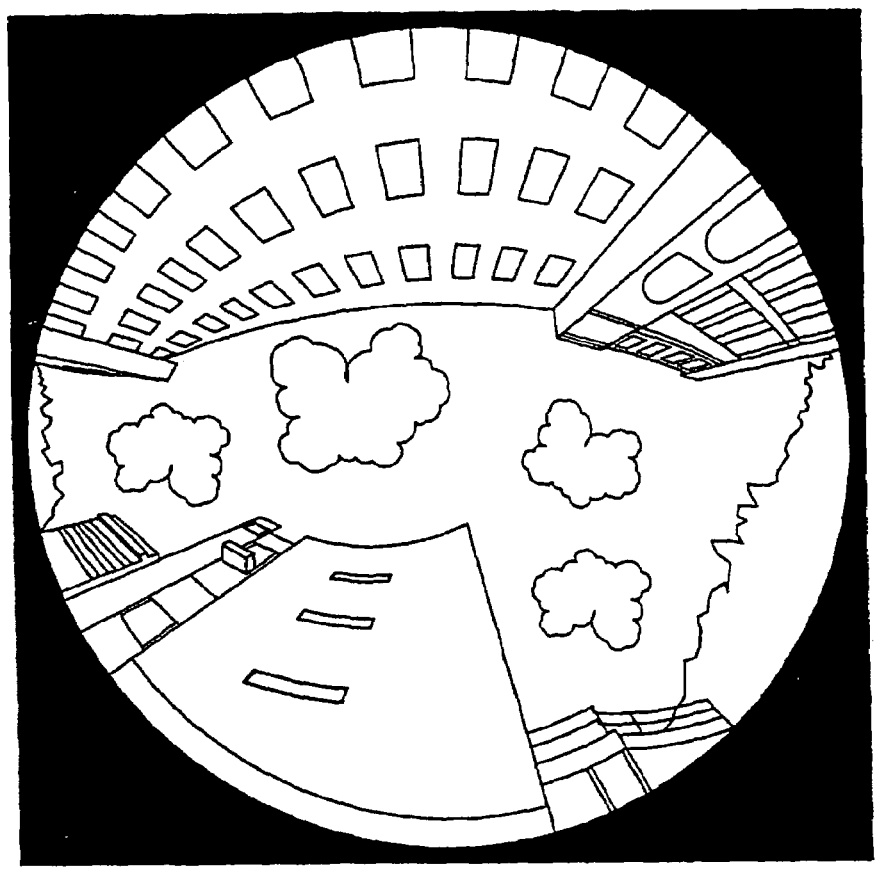
FIG. 1 is a fish eye lens view at an urban location.
Figure 2:
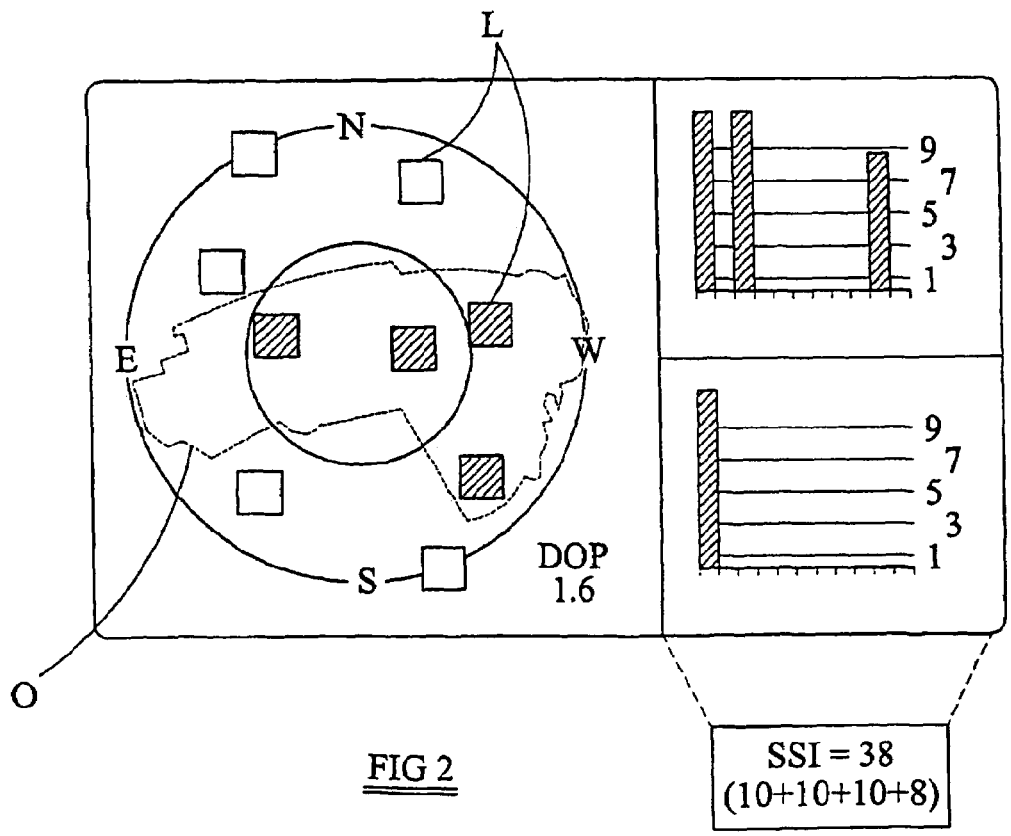
FIG. 2 is an example GPS receiver display.

The largest source of error other than selective availability, when using GPS is due to the restriction of satellite visibility by buildings and topography; an effect which has the potential to be exploited as an estimation of ψs at a fixed location. This can be demonstrated by placing a plot of current satellite locations (L) in the hemispherical field of view (FIG. 2) over a fish-eye photograph of a location. The result is that some satellite visibility is restricted by buildings and trees. An outline (O) of FIG. 1 is shown in FIG. 2 and demonstrates that at this location, the pseudorange from just four satellites (shaded) would be available for triangulation.

Referring to FIG. 3, the system comprises a mapping grade Garmin GPS25 OEM receiver unit 2 (Garmin, USA) connected by a data bus (RS232 serial link) 4 to a notebook computer 6. The receiver unit 2 is mounted in a protective plastic casing along with associated power regulation and protection components (not shown). The computer 6 comprises a user interface 8 (eg. keyboard and/or pointing device), a display 10, a processor 12 and a data storage medium 14. The various computer components being connected by a data and control bus 16. The system is carried by a survey vehicle fitted with a roof-mounted antenna linked to the receiver 2.

When activated, the output of the GPS25 module 2 consists of a series of NMEA 0183 Version 2.0 ASCII output sentences that are sent once a second, together with a module status sentence once each minute (NMEA is the standard protocol used by GPS). Each set of NMEA sentences is referred to as an NMEA paragraph. The sentences and the contents used in this system are GPRMC which contains the time, date, latitude, longitude, hemisphere, speed and course; PGRMT which contains receiver status information; GPGGA which contains the altitude; GPGSA which contains the satellite identification numbers used in the solution, the GPS quality (2-dimensional fix, 3-dimensional fix, or no fix), the positional dilution of precision (PDOP), the horizontal dilution of precision (HDOP) and the vertical dilution of precision (VDOP); and up to three GPGSV sentences which contain the azimuth, elevation and signal strength of all visible satellites at that time. The NMEA sentences are received via the serial port 4 of the notebook computer 6 and managed by software to produce the visual display 10, log the data to a database, allow for user input of road type and land use classifications, and calculate the estimated sky-view factor from pre-established mathematical functions (see below). As will become clear from what follows, not all of the GPS data is essential for a determination of sky-view factor. However, such data is useful in an ice prediction system and method in accordance with the second aspect of the present invention.

The software was written in Microsoft Visual Basic and is therefore event driven. The program allows the user to select a land use classification (city centre or central business district (CBD), urban, suburban or rural), and a road type (motorway, A-Road, B-Road, or minor road) and change these classifications at any time using the keyboard. The user can also switch to database logging on or off at any time. The visual display 10 is updated every second whilst data is being received from the GPS unit.

A software conceptual flowchart is shown in FIG. 4. The program retrieves each NMEA paragraph from the serial input buffer of the notebook computer 6 and divides that paragraph into NMEA sentences. The sentences are then decoded and a collection of the required raw variables is created. The latitude and longitude data is converted to decimal degrees, and the estimated Sky View factor is calculated using one of the set of empirically derived formulae (described below) depending on the current settings of the land use and road type classifications. The required data fields are then written to the database using an SQL statement, and the visual display 10 is updated. The display includes the latitude, longitude, altitude, speed, course, date, time, estimated sky-view factor and the horizontal, vertical and positional dilution of precision. The display 10 also features a compass type representation of the relative satellite locations and a display of the current satellite and receiver board statuses.

In order to derive the appropriate mathematical functions referred to above, a mapping grade Garmin GPSIII was used to measure the number of pseudoranges received (N) and the DOP for 112 reference sites in Birmingham, UK. These 112 sites were broken down into 4 classes including 28 urban sites (buildings only in the field of view), 56 rural sites (sub-divided into 28 having trees with leaves on, 28 leaves off) and 28 suburban sites (buildings and trees). The sites were chosen to encompass a large variation in ψs ranging from urban canyons to rural farmland. Measured also at each site was the satellite status index (SSI). A sample display of the GPS screen is shown in FIG. 2, and demonstrates more clearly how the SSI is calculated. Finally, for comparison, a digital fish-eye JPEG was taken at dusk at each site using a digital camera mounted in a tripod at the same height as the GPS (since values of ψs change in relation to height, it is important that the GPS unit is placed at the correct height of study, e.g. close to ground level for road surface thermal mapping). ψs was then calculated from each digital image utilising a contrast improvement algorithm enabling rapid delineation of sky pixels in the image by use of a fixed threshold value. A value for ψs (shown to be accurate to within ±0.02) is then calculated from the resulting binary image by means of an annular template.

Referring to FIGS. 5 to 8, the number of measured pseudoranges (N), SSI and DOP are plotted against the measured ψs data for each landuse class accompanied by fitted trendlines of maximum explanation. The equations of the trendlines for each dataset are given in Tables 1 to 4 below.

TABLE 1

Urban

| | Satellite data | | |
|---|---|---|---|
| | N | SSI | DOP |
| $\psi_s =$ | 0.069 + 1.012 logN | 0.989 logSSI − 0.820 | 1.031 − 0.701 logDOP |
| $R^2$ (%) | 66.6 | 87.9 | 64.2 |

TABLE 2

Suburban

| | Satellite data | | |
|---|---|---|---|
| | N | SSI | DOP |
| $\psi_s =$ | 0.215 + 0.07 N | 0.202 + 0.009 SSI | 0.801 − 0.536 logDOP |
| $R^2$ (%) | 39.4 | 52.0 | 21.5 |

TABLE 3

Rural (leaves on)

| | Satellite data | | |
|---|---|---|---|
| | N | SSI | DOP |
| $\psi_s =$ | $0.119\ N^{0.641}$ | $0.107 \times 10^{0.011SSI}$ | $0.586 - 0.503\ \log DOP$ |
| $R^2$ (%) | 12.7 | 55.7 | 12.2 |

TABLE 4

Rural (leaves off)

| | Satellite data | | |
|---|---|---|---|
| | N | SSI | DOP |
| $\psi_s =$ | $0.242\ N^{0.6}$ | $0.095\ SSI^{0.531}$ | $0.095\ DOP^{-0.65}$ |
| $R^2$ (%) | 33.9 | 74.6 | 63.5 |

Figure 5A:
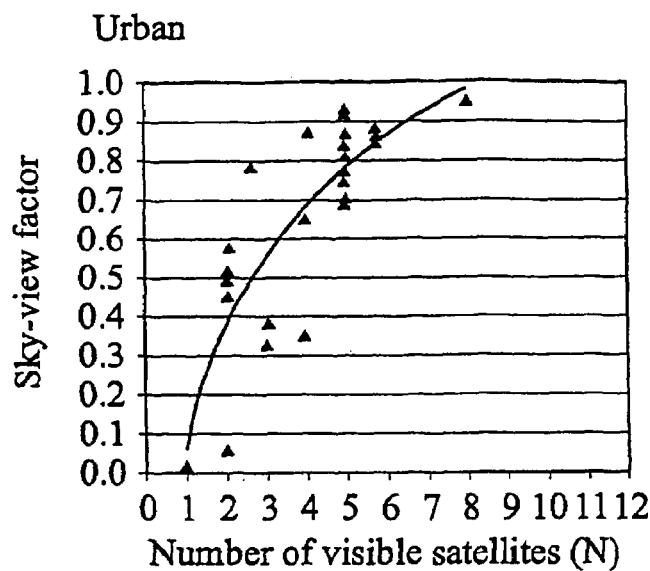
Figure 5B:
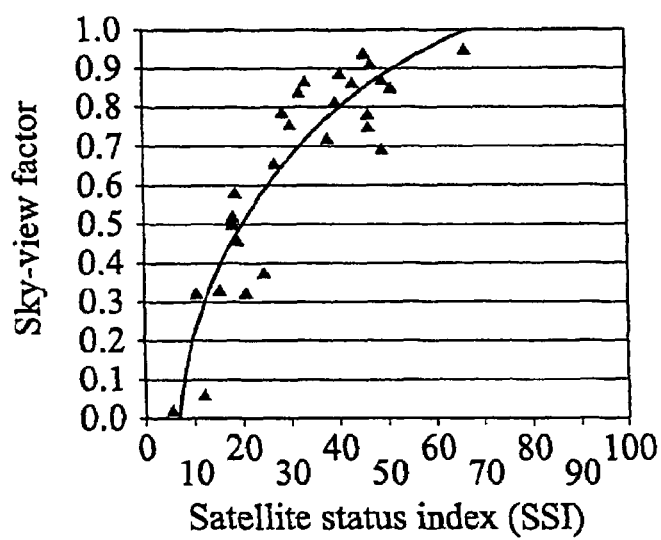
Figure 5C:
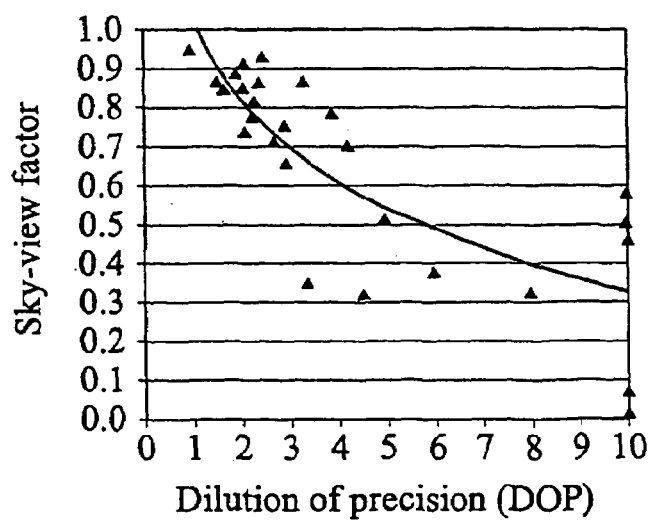

From FIGS. 5 to 8 and the above tables, it can be seen that the use of GPS data for the calculation of ψs by proxy is most reliable in urban environments (64% explanation with DOP values—FIG. 5c, rising to 88% with SSI—FIG. 5b). However, explanation decreases as trees are introduced into the sky hemisphere. Trees add extra complexity to the study, by virtue of the fact that canopies vary in height and type as well as crown closure, all of which affect the quality of GPS reception. Consequently, explanation increases in leaves off conditions due to the diminished complexity of canopy layers. The weakest relationships are found in the suburban class (52% explanation with SSI—FIG. 6b). This is a result of varying proportions of building and tree elements in the field of view, both of which impact differently on the number and quality of pseudoranges received.

Figure 6A:
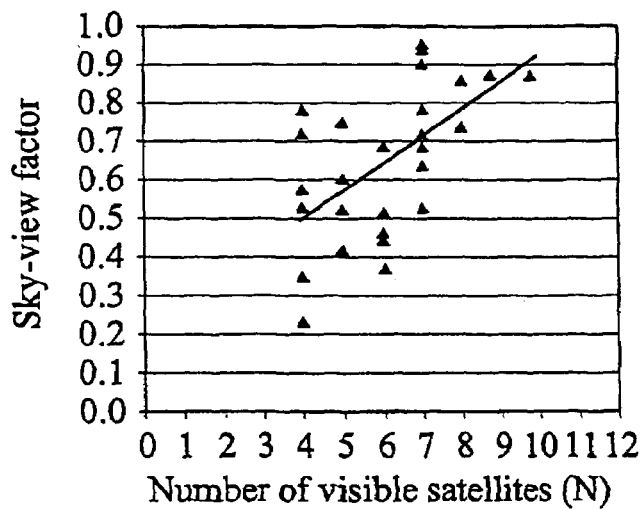
Figure 6B:
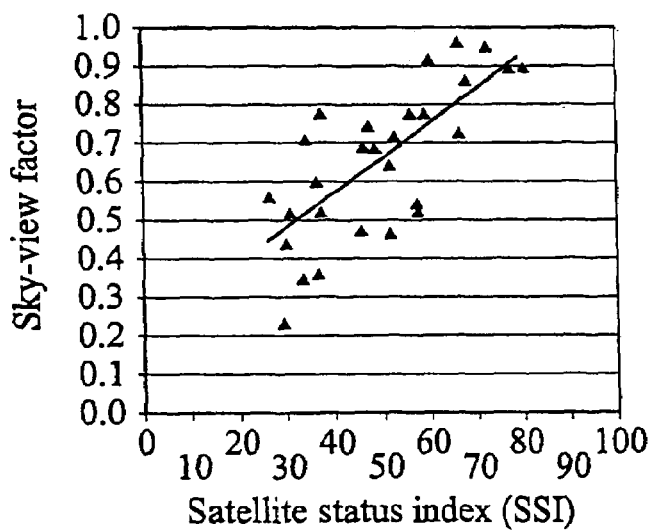
Figure 6C:
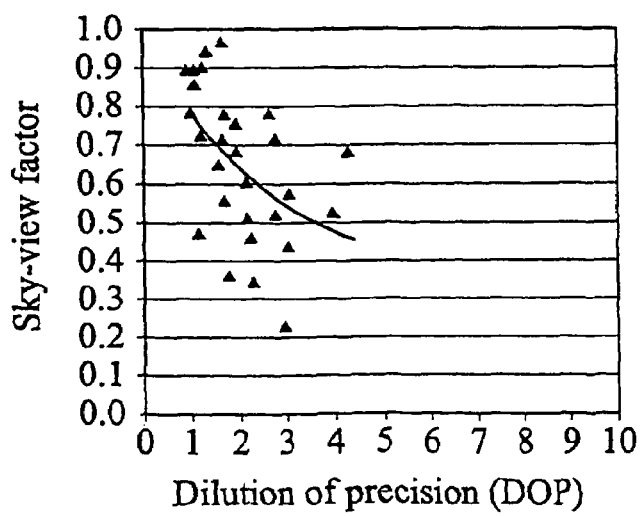
Figure 7A:
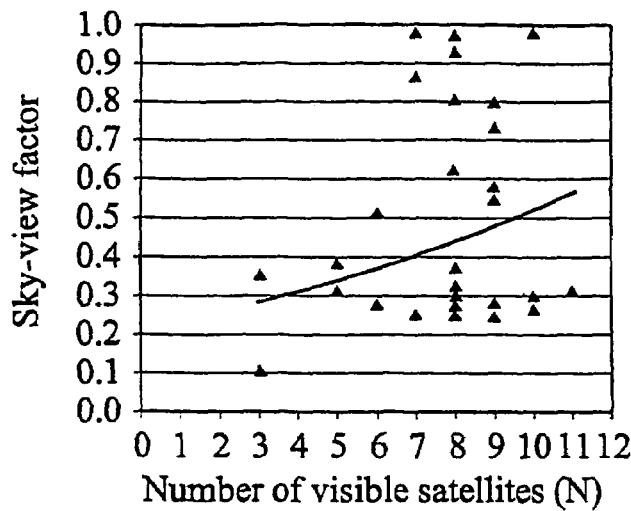
Figure 7B:
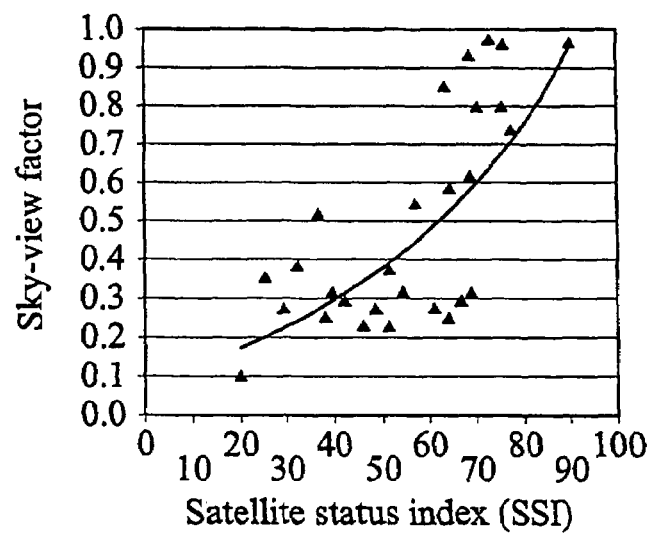
Figure 7C:
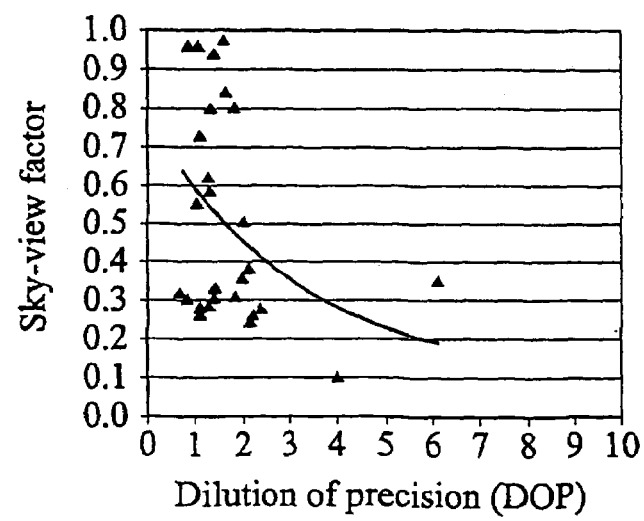
Figure 8:
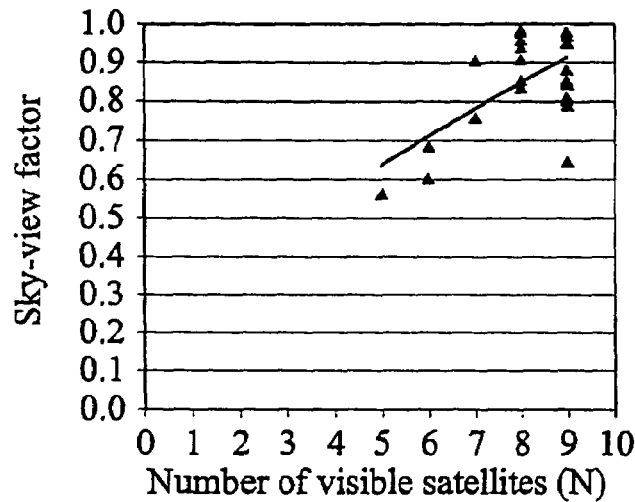
Figure 8:
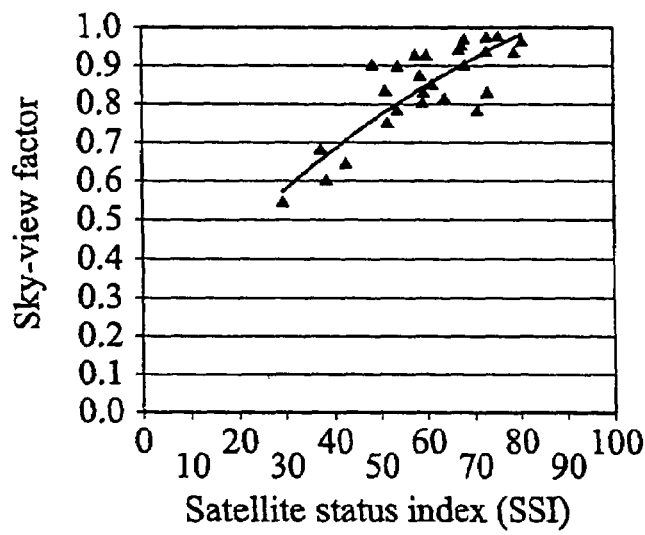
Figure 8:
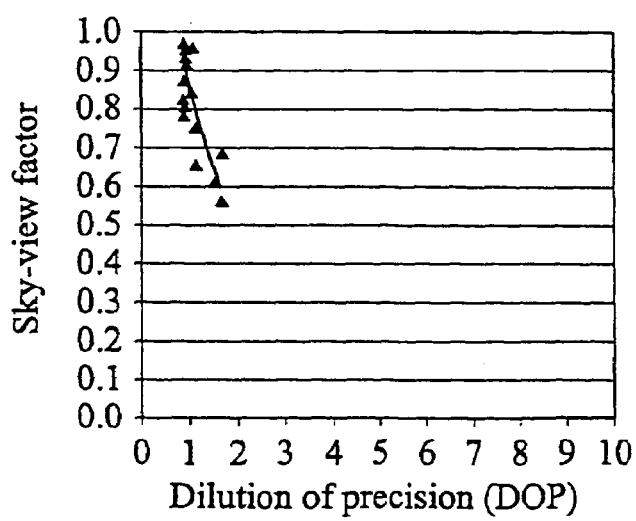

Of the three techniques used, SSI consistently has the best explanation of ψs variation in each landuse. However, the nature of the relationship changes as image complexity increases. Simple urban images produce a logarithmic relationship with values tending to a minimum SSI of 10–20 (FIG. 5b). This is because 2 or 3 satellites will nearly always be visible directly above the location. After this minimum, SSI increases linearly with ψs. The opposite is true for leaves on rural environments where an exponential relationship holds (FIG. 7b). Under canopy ψs is typically always around 0.25, but signal reception is variable as it is controlled by the foliage of the canopy and varies depending on the size and species of tree. At low values of ψs (<0.3) foliage height and type is a more dominant control on GPS reception than crown closure. Above values of 0.3, the effect of crown closure dominates and a more linear relationship with ψs holds. In suburban environments, the effects of trees and buildings cancel each other out to produce a linear relationship (FIG. 6b). A similar relationship can also be seen in the rural leaves off landuse class (FIG. 8b), though this relationship should be viewed with caution as only relatively high values of ψs could be sampled due to an absence of low ψs locations during leaves off conditions.

The relationships described for SSI are also similar for N (see FIGS. 5a to 8a, the exception being a power relationship in the rural leaves on class, FIG. 7a), and is to be expected as N is essentially a crude measure of SSI. For all four landuse types a negative logarithmic relationship exists between DOP and ψs (FIGS. 5c to 8c). However, the strength of the relationship is not as strong as the other indices, ranging from 64% explanation in urban environments to just 12% in rural areas. Although N and DOP may not be as useful as SSI for direct estimation of ψs, they are still useful for estimation when combined with SSI by means of a multiple regression analysis (table 5). The results shown in table 5 indicate that the combination of the three indices increases explanation for each landuse class. The difference is minor in suburban and urban environments but results in a marked improvement on explanation in rural areas.

TABLE 5

Multiple regression equations to predict $\psi_s$ using N, SSI and DOP for different landuses.

| Landuse | n | Regression Equation | $R^2$ |
|---|---|---|---|
| Urban | 28 | $\psi_s = 0.169\ \log N + 0.742\ \log SSI - 0.407$ | 88.0% |
| Suburban | 28 | $\psi_s = 5.55\ \log SSI - 17.517\ \log N - 4.762$ | 52.1% |
| Rural (leaves on) | 28 | $\psi_s = 2.47\ \log SSI - 1.759\ \log N - 2.249$ | 72.1% |
| Rural (leaves off) | 28 | $\log \psi_s = 0.45\ \log SSI - 0.29\ \log N - 0.16\ DOP - 0.29$ | 75.8% |

Due to the nature of the technique, there is always likely to be a certain amount of scatter in any relationships derived. In effect, the hemispherical field of view at each location is being sampled at just 10 points. The exact position and number of these satellites is temporally variable and means that there will be subtle variations in the results obtained for each survey. This can partly be accounted for by consultation of satellite almanac data which shows variations in the maximum possible number of visible satellites at a location and thus maximum DOP over a 24 hour period (FIG. 9a) Such data enables indices to be expressed as a percentage of the maximum for that particular time, ultimately improving the accuracy of results and also allowing for the reproducibility of results collected on different days to be tested. FIG. 9b shows a plot of actual measured ψs against two different leaves off datasets collected over two consecutive days each corrected with respect to the almanac data shown in FIG. 9a. The resulting multiple regression trendlines are not identical but both days of analysis yielded similar results ($R^2$ between the two surveys is 79.0%). Also, the correction of the GPS data with almanac data has slightly improved explanation on each survey (table 6). The potential of such corrections is that more rigorous algorithms can be developed which when accompanied with future improvements in the satellite GPS system, would further reduce scatter in the derived relationships.

TABLE 6

Variation in $R^2$ values when correcting satellite data with almanac data.

| | Uncorrected $R^2$ | Almanac Corrected $R^2$ |
|---|---|---|
| Survey One | 75.8% | 80.4% |
| Survey Two | 78.7% | 82.2% |

In a modification of the above described system, satellite almanac data covering the area to be surveyed is stored in the data storage means of the system, and used to improve the accuracy of the calculated ψs value. Accuracy may also be improved by applying a weighting factor to the location of each satellite in the sky.

From the foregoing, it will be readily apparent that the present invention provides a method and system which allow the sky view factor for a location to be rapidly determined to an acceptable degree of accuracy, particularly in urban environments. Importantly, since the method does not rely on any imaging at the location, determination of the sky view factor is not affected by overhead weather conditions or even lighting conditions. This is particularly significant where large areas are to be surveyed (eg. a road network) and allows the sky view factor for a large number of locations to be measured over a relatively short period of time.

Local authorities currently rely on road weather forecasts derived from RWIS (road weather information system) ice prediction models to achieve 'best value' from their winter road maintenance budget. The prediction and subsequent prevention of snow and ice on highways is not only expensive (as well as the delivery costs, salt corrosion causes damage to vehicles and structures), but there is an environmental impact on excessive salt usage which can potentially damage groundwater supplies, soils and ecology. Thus, although it requires much less salt to prevent ice formation than it does to melt existing ice, the decision on whether to salt or not is a difficult one, particularly on marginal nights where temperatures are around the 0° C. threshold. Unfortunately, since ice is most slippery at 0° C., a small error in judgement, perhaps based on a poor predictive model, can have disastrous results.

Currently, road weather models only produce forecast curves for the outstation from which meteorological data is obtained. As previously described, the forecast is projected around the road network using thermal mapping. Basically, thermal mapping is a systematic surveying of RST (road surface temperature) at a set resolution around a road network using an infra red camera connected to a distance measuring device (eg. a vehicle speedometer). The extent of RST variation around a route is determined by atmospheric stability. Surveying is undertaken under a variety of synoptic weather conditions to ensure full coverage of different levels of stability. The differentials are then presented as thermal maps in a geographical information system and combined with the daily forecast curves to complete the spatial prediction component of the model.

By considering the processes of how road constructional and geographical parameters interact to influence RST around a road network, a new spatial dimension is added to an existing numerical forecast model. Effectively, a forecast curve can be produced for every location surveyed. The particular importance of ψs as a parameter influencing RST has already been discussed above. Both statistical and numerical modelling has highlighted ψs as the dominant parameter for the prediction of RST in stable conditions. However, the influence of other geographical parameters cannot be ignored.

The ice prediction system detailed below uses novel surveying and modelling techniques and represents a fusion of GPS and geographical information system (GIS) technologies coupled with ψs analysis. The model has the ability to explain 72% of the variation in RST around a survey route (subject to atmospheric stability) with an accuracy comparable to existing RWIS solutions, without the need for thermal mapping surveys.

The improved road weather prediction model was developed from a previous model (Thornes, PhD thesis, University of London, 1984, hereinafter ref 1) to predict local variations in RST over both time and space. The temporal component of the model was first developed by Outcalt (Geographical analysis 3, 379–393, 1971). Based upon a set of basic energy balance equations, the model simulates the surface temperature and energy transfer regime of a selected site. Thornes (ref 1) later streamlined the model to iteratively predict RST over a 24 hour period, based exclusively on the input of meteorological data at noon from a forecast outstation. The model is now further developed to provide a high resolution, site specific spatial component.

A summary of the inputs to the new model are shown in table 7. Meteorological inputs remain the same as those used by the Thornes model (ref 1), however to enable spatial projections, information regarding geographical parameters is also required. The original model was designed to be interpolated around a road network by means of thermal maps. The current model is self-contained and thermally projects RST around the road network entirely by means of a geographical parameter database (GPD). The database comprises several geographical parameters; latitude, longitude and altitude (measured at a 20 m resolution with a global positioning system), an empirical cold air pooling index (CAPI) calculated by differentiating altitude data, ψs calculated from digital fish-eye imagery and manually determined ordinal classifications of roadtype and landuse.

TABLE 7

Summary of inputs to the numerical model.

| Temporal Data | Meteorological Data | Geographical Data | Pre-Coded Constants |
| --- | --- | --- | --- |
| Angle of Declination | RST at Noon | Latitude | Thermal Conductivity of soil |
| Radius Vector | Air Temperature[1] | Longitude | Thermal Conductivity of concrete |
| Date | Dew Point[1] | Altitude | Thermal Conductivity of asphalt |
|  | Wind Speed[1] | Topographical Index | Thermal Diffusivity of soil |
|  | Rainfall[1] | Sky-View Factor | Thermal Diffusivity of concrete |
|  | Cloud Cover[2] | Screening Matrix | Thermal Diffusivity of asphalt |
|  | Cloud Type[2] | Landuse | Road Damping Depth |
|  |  | Road Classification |  |

[1]Nine values at 12:00, 15:00, 18:00, 21:00, 00:00, 03:00, 06:00, 09:00, 12:00.
[2]Eight values averaged over the periods 12:00–15:00, 15:00–18:00, 18:00–21:00, 21:00–00:00, 00:00–03:00, 03:00–06:00, 06:00–09:00, 09:00–12:00.

Latitude is an important constraint on climate and RST. For example, Scotland has more snow and ice than other parts of the UK. Countries at higher latitudes have longer winter seasons, but countries as far south as Greece and Spain still have ice problems. The main impact of latitude is the influence in the laws of radiation geometry and is thus a large scale control on quantities of incoming solar radiation (Cornford et al, Int. J. Climatology, 16, 339–357, 1996). Latitude is simply read from the GPS and used to calculate variations in incoming short-wave radiation with respect to the standard laws of radiation geometry.

Altitude generally decreases RST as a result of the environmental lapse rate (approximately 6.5° C. per 1000 m). The impact of altitude on RST in Nevada, USA has been studied (Shao et al, Meteorological Applications, 4, 131–137, 1997). It was shown that altitude had a considerable effect on RST, but the relationship between the variables was complicated, non-linear and not always true. In the present model, GPD altitude values are corrected relatively with respect to the height of the forecast outstation before being used to thermally project RST in line with the environmental lapse rate (which is varied in the model depending on atmospheric stability). As a parameter, the effects of altitude on RST should typically be most apparent during times of low atmospheric stability. However, as stability increases, the impacts of topography should lessen this relationship.

Topography is often considered to be the major factor in causing differences in RST during extreme nights with small differences in topography producing large variations in RST across the mesoscale landscape. Variations in temperature induced by topography often cause the lowest RST to be recorded at valley bottoms. Several theories have been proposed to explain this phenomenon, for example, Thompson (Weather, 41, 146–153, 1986) considers the earlier cessation of turbulent heat transfer in sheltered locations as critical in producing lower temperatures. Alternatively, Tabony (J. Climatology, 5, 503–520, 1985) discusses the production of horizontal isotherms in small-scale sheltered terrain. Such theories may explain the impact of microtopography on temperature distribution, but when dealing with larger scale topography, the more commonly accepted cause of temperature variations is the katabatic theory. During stable conditions, a layer of dense cold air forms at the surface and causes a temperature inversion. If the topography is undulating, the layer of cold air becomes mobile and gravitates down slope as a katabatic flow. Flows follow lines of drainage and continue moving until a topographic or thermal barrier is reached. At the top of the temperature inversion, lapse rates return to normal and temperatures are at their warmest. This feature is called the thermal belt and is a dynamic feature whose height varies considerably with the strength of the katabatic flow and the relative size of surrounding topography.

This is accounted for in the model by means of an index of surface temperature bias by cold air pooling (CAPI). This bias is taken into account at locates in valley bottoms (beneath the thermal belt) between sunset and sunrise on stable nights where it is simply subtracted from the forecasted RST at that site. However, the strength of the index is suitably reduced on less stable nights in line with changes in wind-speed and cloud cover (Bogren et al, Int. J. Climatology, 20, 151–170, 2000).

Realistically, for katabatic theory to be modelled satisfactorily, four dimensions need to be considered. Indeed substantial amounts of research has been attempted to model the structure, the nature and the dynamics of katabatic drainage. However, these studies are too complicated to be used to predict the influence of topography during a survey. Hence, the best approach was deemed to be the use of empirical formulae. As part of their ongoing work to develop a local climatological model for southeast Sweden, Bogren et al (Int. J. Climatology, 11, 443–455, 1991, hereinafter ref 2) investigated the relationship between RST and the topographical parameters of 140 valleys across Sweden. Though many parameters influence the magnitude of cold air pooling, the use of a multiple regression model identified valley depth and valley width as the most influential parameters during stable conditions;

If $W \geq 0.01$ and $D \geq 1$ then $$\Delta S = 0.35 + 0.9W + 0.025D \qquad \text{Equation 1}$$

Where $\Delta S$ is the reduction in surface temperature, W is valley width in kilometres and D is valley depth in metres.

It was found that 55% of the variation in RST in valleys could be explained by this simple two-dimensional valley geometry (ref 2). Hence, working on the assumption that this equation is applicable in the UK, a simple cold air pooling index (CAPI) was developed around relative variations in altitude. The location of valley bottoms and hilltops was found by differentiating the GPS altitude data with respect to horizontal distance. Once the locations are determined, the relative height and width of each valley can be calculated, so producing a database of width and height measurements of every valley encountered during the survey. Then, if a survey point is defined as in a valley and below the thermal belt (for simplicity, assumed to be a constant 5 m), the data is run through equation 1 above to obtain a prediction of RST reduction at that particular site.

As discussed above, the sky view factor ($\psi$s) is a dimensionless parameterisation of the quantity of visible sky at a location. Represented as a value between zero and one, $\psi$s approaches unity in perfectly flat and open terrain. The replacement of a section of the cold sky hemisphere with a warmer surface results in increased nocturnal air and surface temperatures at locations with low $\psi$s. The model accounts for this effect by using $\psi$s as an extra coefficient on black body emission in the Stefan Boltzmann equation:

$$\text{flux} = \epsilon \sigma \psi s T^4 \qquad \text{Equation 2}$$

Where $\epsilon$ is emissivity (assumed constant 0.95), $\sigma$ is the Stefan Boltzmann constant and T is temperature.

After the completion of a sky view factor mapping (VFM) survey (see below), each of the thousands of frame grabbed images need to be processed into a value for $\psi$s. Using existing techniques, this is potentially a mammoth task and hence, a rapid computerised solution was developed. This approach uses a critical number thresholding algorithm. Initially, the image is converted into an array of grayscale digital numbers (DN) between 0 and 255. Then to speed up processing time, the size of the image is reduced before the application of the threshold DN algorithm. The result is a binary image of zeros (non-sky pixels) and ones (sky pixels), which can be analysed to calculate $\psi$s. Once calculated, $\psi$s is appended into the database by matching the time the image was taken with the nearest time recorded in the original GPS datafile.

Screening affects the surface radiation budget by the obstruction of incoming short-wave radiation in the day. Topographically screened environments will produce lower RST as a result of less direct short-wave radiation reaching surfaces in shadow. Screening is generally systematic with the exception of trees and has a strong relationship with daytime RST.

The use of numerical modelling enables this parameter to be studied in more detail. However, for this to be achieved it is first necessary to incorporate a measure of screening into the GPD. A simple parameterisation such as $\psi$s is insufficient to describe the effect of surface geometry on the quantities of incoming radiation at locations with an obstructed sky hemisphere. Instead, the relationship between each individual screening object and the solar beam is required.

The impact of screening at a location throughout the day can be rapidly determined using the same fish-eye image from which $\psi$s is derived for the GPD. The image is orientated to the north and divided into 5° segments of which the radius of intrusion (r) of building and trees into the photo is measured (FIG. 10a). This process is fully automated and generates 72 values which are appended to the GPD. Then r can be converted into the 'building' angle (ζ) by using equation 3 below:

$$\zeta = \frac{r\pi}{2r_o}$$ Equation 3

Hence, for any particular azimuth, ζ can be compared with solar zenith angle (Z) to determine whether a location is receiving direct beam radiation or not at any particular time, see FIGS. 10b (diffuse and direct) and 10c (diffuse only). Once the distinction has been made of the nature of radiation received at the surface, the energy balance equations are modified appropriately for each particular model iteration. As the original model splits the incoming solar radiation into direct and diffuse components, if it can be determined that for a certain azimuth the location is in shade, the direct component of the model can be switched off.

Road construction profiles vary around the road network. Deeper profiles on motorways and A roads are likely to consist of asphalt on top of a deep concrete base, whereas minor roads will have shallower construction with less asphalt. This variation in construction causes minor differences in thermal conductivity and diffusivity resulting in significant variations in RST. The term 'thermal memory' is used to describe the length of time which a surface stores heat from daytime solar radiation. Roads with deeper construction such as motorways have a large thermal memory and hence, are often the warmest sections of a road network. This effect is particularly noticeable during spring and autumn months when the input of solar radiation is greater. However, if a road crosses a bridge, its construction and thermal memory is reduced.

Good quality road construction data is realistically only available from highway core samples. These are expensive, site specific and ultimately unrealistic sources of data, meaning that numerous assumptions have to be made in models. The ordinal classification used in the GPD is basic but objective and numerical modelling enables this simple classification to be developed further.

The model assumes a flexible pavement with a constant damping depth of 72 cm split into five calculation zones. However, variations in construction of this 72 cm profile with respect to materials and thermal properties are parameterised in the model with respect to the ordinal road classification. The general assumption used is that as a road increases in status, a greater proportion of the profile will be represented by asphalt and concrete at the expense of a soil subbase (table 8). Approximations of road construction per class are difficult as no standard design procedure exists. However, consultation of the British road procedure illustrates that the assumption made in table 8 are appropriate. It will be understood that for use in other countries, the road construction approximations may need to be adjusted to account for different road building practices.

Thus, depending on the road classification, the model is run with different values for thermal conductivity and diffusivity encountered within the profile to calculate the temperature for each zone. Values for thermal conductivity and diffusivity are shown in table 8. Thermal properties for soil are more difficult to parameterise as values will vary with soil type and wetness. Hence for simplicity, the soil beneath a road was assumed to consist of dry organic matter. The information stored in table 8 is then entered into the one dimensional heat conduction equation in the original model, thus allowing the temperature to be forecast at the 5 depths.

TABLE 8

Variations in the materials and thermal properties of the ordinal classified road construction profiles used in the model.

| Depth | Motorway (1) | A-Road (2) | B-Road (3) | C-Road (4) |
|---|---|---|---|---|
| | Materials | | | |
| 0–4.5 cm | Asphalt | Asphalt | Asphalt | Asphalt |
| 4.5–9 cm | Asphalt | Asphalt | Asphalt | Concrete |
| 9–18 cm | Asphalt | Asphalt | Concrete | Concrete |
| 18–36 cm | Concrete | Concrete | Concrete | Concrete |
| 36–72 cm | Concrete | 80% Concrete 20% Subgrade/Soil | 50% Concrete 50% Subgrade/Soil | Subgrade/Soil |
| Over 72 cm | Subgrace/Soil | Subgrade/Soil | Subgrade/Soil | Subgrade/Soil |
| | Average Thermal Conductivity (cal cm$^{-1}$sec$^{-1\circ}$ C.) | | | |
| | $3.9 \times 10^{-3}$ | $3.5 \times 10^{-3}$ | $2.9 \times 10^{-3}$ | $2.1 \times 10^{-3}$ |

Where the thermal diffusivity of asphalt, concrete and soil is $0.7 \times 10^{-2}$ cm$^2$sec$^{-1}$, $1.2 \times 10^{-2}$ cm$^2$sec$^{-1}$ and $0.1 \times 10^{-2}$ cm$^2$sec$^{-1}$ respectively The impact of traffic can also significantly modify RST. In addition to increasing quantities of anthropogenic heat, vehicles cause mixing of hot and cold air layers and also shadow the loss of longwave radiation from the road surface. The impact of vehicles can be quantified on multi-laned roads, where the increased volume of slower moving vehicles on nearside lanes can produce increased RST of up to 2° C. (Parmenter et al, Transport and Road Research Laboratories Research Report, 71, 1–19, 1986). The impact of traffic on RST is noticeable on most nights, though larger values are likely to be recorded in extreme conditions due to increased potential radiative losses.

Theoretical simulation of the influence of traffic on RST is difficult. A general traffic algorithm is accounted for in the model by considering atmospheric stability along with both ordinal road and landuse classifications. The three key effects of traffic outlined by Thornes (in Highway Meteorology, 39–67, Eds. Perry and Symons, E & FN Spon, London, 1991) are treated in the model as follows:

1. The increased input of anthropogenic heat causes differential heating of the road. This is accounted for in the model by introducing a slight bias a (table 9) depending on landuse and road classifications. City centres and motorways are assumed to be the most heavily trafficked sections of road. After this there is a logarithmic decrease in bias through urban areas, suburbia and finally rural areas.

2. Cars also shadow long-wave loss from the road surface, and this has been incorporated into the radiation budget as a coefficient on ongoing radiation similar to the ψs. Hence, a shadow co-efficient b (table 9) is also incorporated into the Stefan Boltzmann equation 2.

3. Finally, cars also cause increased turbulence. This is dealt with in by simply increasing wind-speed by 2 ms$^{-1}$ in the energy balance equations.

TABLE 9

Ordinal classification of landuse and roadtype translated into parameters for the model.

| | Motorway (1) | | | A-road (2) | | | B-road (3) | | | C-road (4) | | |
|---|---|---|---|---|---|---|---|---|---|---|---|---|
| | a | b | $Z_0$ | a | b | $Z_0$ | a | b | $Z_0$ | a | b | $Z_0$ |
| city centre (1) | 1.00 | 0.85 | 2.00 | 1.00 | 0.85 | 2.00 | 1.00 | 0.85 | 2.00 | 1.00 | 0.85 | 2.00 |
| urban (2) | 1.00 | 0.90 | 1.00 | 0.75 | 0.90 | 1.00 | 0.50 | 0.90 | 1.00 | 0.25 | 0.90 | 1.00 |
| suburban (3) | 1.00 | 0.95 | 0.50 | 0.50 | 0.95 | 0.50 | 0.25 | 0.95 | 0.50 | 0.12 | 0.95 | 0.50 |
| rural (4) | 1.00 | 1.00 | 0.50 | 0.25 | 1.00 | 0.25 | 0.12 | 1.00 | 0.25 | 0.00 | 1.00 | 0.25 | where a = traffic bias (° C.),
b = traffic coefficient and
$Z_0$ = roughness length (m)

The model could be further improved by considering traffic densities and RST. However, accurate traffic density data is not freely available, and also the separation of the impact of traffic on RST is difficult.

The impact of landuse has been demonstrated by the parameterisation of traffic densities. This enables a measure of anthropogenic heat into the model. Canyon geometry was isolated as the main cause of the urban heat and is adequately covered in the model by means of the ψs and screening. However, a further feature of canyon geometry which contributes to the urban heat island phenomenon is the impact on wind.

Turbulent heat transfer can be reduced in sheltered areas and thus this needs to be incorporated into the model. This is achieved by varying roughness length with respect to the ordinal landuse classification.

Roughness length ($Z_0$) is a measure of aerodynamic roughness which controls the height which the logarithmic wind profile extrapolates to zero (Oke, Boundary Layer Climates, Routledge, 1992). $Z_0$ is a function of shape, density and height of surface elements and thus, values can vary considerably from location to location. It is not unusual to find $Z_0$ approaching 8 m in the centre of large cities compared to just 0.5 m for suburbia. Due to the often complicated interaction of surface elements, $Z_0$ is notoriously difficult to calculate, causing large variations in estimates in the literature.

Values were taken as per landuse classification via a simple look-up table of roughness lengths assimilated from the scientific literature. The values used per landuse class are summarised in table 9 and have been rounded up to follow an exponential decay curve. One exception to this rule is rural motorways which have been placed at a value of 50 cm instead of the original 15 cm value proposed by Thornes (ref 1). This is because the original value was considered too small to fully represent a heavily trafficked road which passes trees, pylons and cuttings.

To acquire the necessary ψs and geographical data, surveys were carried out over the 1999/2000 winter season. The imagery from which ψs was calculated was obtained from a roof-mounted digital camera fitted with a fish-eye lens. Surveys were carried out during the day to allow for suitable light levels to acquire the imagery. Homogeneous cloudy skylines were found to produce the most accurate results, although surveys at dusk also produced good imagery. A frame was grabbed every second via the cameras video link. During the survey, the surveyor was required to mark any transitions in road type and landuse. This was done by simply pressing an appropriate key on a keyboard. Latitude, longitude and altitude data was obtained via a GPS receiver. This data forms the basis of the GPD Upon completion of post processing, the calculated ψs and CAPI values are simply appended to the original GPS datafile to produce a GPD with the fields; latitude, longitude, altitude, CAPI, ψs, roadtype and landuse. The GPD term is then suitable for use in modelling studies, or alternatively plotted in a GIS (geographical information system) to enable the spatial distribution of each individual parameter to be investigated.

The inclusion of a GPD into a numerical road weather model effectively enables a forecast curve to be produced for every location surveyed in the GPD, i.e. the model is run for each site. The model output is a time/space RST matrix of resolution 20 minutes/20 metres. The output of RST in this format is very dynamic as it enables RST to be displayed for any particular site at any particular time. However, the RST matrix is at its most powerful when appended with latitude and longitude data which then allows for the plotting of RST data in a geographical information system. FIG. 11 shows hourly thermal projections for the study route shown in FIG. 12 using the method described above. RST falls below zero first on the minor roads of rural Worcestershire around 2200 h (A) which remain the coldest sections of the route throughout the night. However, the city centre (B) remains well above freezing throughout the night, whereas RST on the motorway is marginal, fluctuating around freezing point between 0300 h and dawn (C). Such a detailed knowledge of cooling rates over a large area is beneficial to the winter maintenance engineer, providing key information for the optimisation of salting routes and is a major step forward from the minimum temperatures forecasted with thermal maps.

One embodiment of a working RWIS prediction system in accordance with the present invention has been described above. Further embodiments differ in one or more of the following respects:

1. Landuse Classifications

As described above, landuse was divided into urban, suburban, rural (leaves on) and rural (leaves off). Potentially, the model can be made more accurate by using additional classifications (eg. industrial) and/or further subdivisions (eg. suburban may be further classified according to housing density). However, the assignment of locations during survey becomes a complicated and subjective task. A solution is to use satellite imagery in a supervised classification. In the present case, a LANDSAT image is used to identify landcover types in the West Midlands.

2. Altitude and Topography

The intrusion of buildings and trees in the hemispherical field of view can result in a reduction of the number of satellites being used for triangulation to drop to below four. The consequent fall in VDOP (vertical dilution of precision) can result in GPS measured altitude values to be potentially wildly inaccurate (±200 m). This can be a major problem in that, If confidence can not be expressed in altitude data, then subsequent inferences of the impact of topography are meaningless. One solution is to interpolate altitude data between known points. Clearly the accuracy of such an approach is dependent on the variation of topography over the survey route and the number of known data points.

A better solution to improve the accuracy of both the altitude and topography datasets is to derive information from Digital Terrain Models (DTM). The cost of DTM's has fallen recently to the extent that high resolution models are available very cheaply and can instantly provide an accurate altitude dataset from which values can be looked up using just latitude and longitude values. However, the major advantage of using a DTM is that algorithms can be developed to enable dynamic modelling of the influence of topography upon the road network. The potential of such an approach is demonstrated by Laughlin & Kalma (1990) who used a DTM derived from topographic maps to successfully produce an index of frost risk. However, this approach still yields a static value of temperature reduction and hence additional numerical modelling must be implemented to enable a dynamic solution. A DTM also has the potential to determine the existence and distance of a road from water bodies for use in modelling.

3. Sky View Factor

As previously described, a good approximation of the sky view factor can be obtained from GPS data, using the pre-calibrated functions relating N, DOP and SSI for the various landuse classifications, thereby obviating the need for any imagery on a survey. It should be noted that although screening is an important factor for daytime screening is not an important parameter for nocturnal RST. Therefore, in the present application, the benefits of omitting the digital imaging far outweigh the disadvantages.

4. RoadType Classifications

As with landuse classification, roadtype is entered manually during a survey. An effective and more satisfactory solution is to take the task of classification away from the surveyor. Vector map products for use in GIS are now commercially available (e.g. Ordnance Survey Meridian data). By providing a national vector dataset at a street level resolution, vector data represents an instant objective solution to the roadtype classification procedure.

5. Numerical Modelling

Finally, the zero-dimensional energy balance approach of the model does not simulate advection. A consequence of this is that although two sites are located just 20 m apart, a temperature differential of up to 8° C. could be evident as the model assumes no horizontal mixing. The lack of a horizontal forecasting component can prove problematic as meteorological variables such as cloud cover can be extremely variable over a region.

This problem can be mitigated by using a mesoscale forecast model. For example, the Meteorological Office use a high resolution version of their Unified model modified for site specific RST forecasts. It has the ability to resolve the impact of major topographical features on the mesoclimate. The data output is then used to force the road weather model. A similar approach can be adopted to improve the current model, for example by utilising RAMS (Regional Atmospheric Modelling System). RAMS simulates different atmospheric circulations at a variety of nested scales, and can provide an extremely dynamic forecast solution. It will be understood that by using DTMs, supervised landuse classifications and the geographical parameters, surveys can be reduced entirely to the collection of $\psi$s data (either by camera or by proxy). Since no user intervention is required, it is anticipated that GPS receivers could in future be fitted to taxis, buses, gritters and/or other public vehicles. $\psi$s and road condition information could then be constantly relayed to a base station, allowing accurate predictions of site specific, temporal minimum RST.

If gritters are fitted with GPS receivers, there are added benefits in that the vehicles can be tracked to ensure that gritting/salting is effected in the right places at the right time. It is envisaged that if the spreading mechanism is activated by GPS, selective salting with respect to location and rate can be achieved on marginal nights.

The invention claimed is:

1. A method of determining the sky-view factor at a location, comprising the steps of:
   (I) receiving data from at least one global positioning satellite at said location, and
   (ii) comparing the data so obtained with a mathematical function derived from corresponding data obtained from reference locations at which the sky view factor is known, whereby to arrive at an approximation of the sky view factor at said location.

2. A method as claimed in claim 1, wherein the satellite data is selected from one or more of (I) the number of satellites in line of sight at said location, (ii) the sum of signal strengths of the or each satellite, and (iii) the dilution of precision value at said location.

3. A method as claimed in claim 1, wherein the mathematical function is obtained by plotting for each reference location the actual sky view factor against the satellite data corresponding to that to be received for the location whose sky view factor is to be determined, and fitting a curve through the plots, the mathematical function corresponding to the equation of the fitted curve.

4. A method as claimed in claim 1, wherein said reference locations are selected to be of a similar type to the location whose sky view factor is being determined.

5. A method as claimed in claim 1, wherein locations are classified according to their surroundings.

6. A method as claimed in claim 5, wherein locations are classified as urban, suburban, rural with leaves on trees or rural with leaves off trees.

7. A method as claimed in claim 5 which includes an initial step of receiving data from a user on the type of location at which the sky view factor is being determined, the mathematical function being derived only from reference locations of that same type.

8. A method as claimed in claim 5 in which data on the type of location at which the sky view factor is being determined is received from a database.

9. A method as claimed in claim 8, wherein said database is created from a satellite image.

10. A system for generating an approximate sky view factor at a location, said system comprising:
- (I) data receiving means for receiving data from GPS satellites,
- (ii) data storage means,
- (iii) a processor, and
- (iv) output means selected from a visual display and/or printer for outputting the calculated sky view factor, wherein the data storage means holds a pre-defined mathematical function relating GPS satellite data at a location to the approximate sky view factor at that location, and in use, satellite data received by the data receiving means is transferred to the processor where a sky view factor for that location is calculated from said mathematical function.

11. A system as claimed in claim 10, wherein the data receiving means is adapted to receive satellite data selected from one or more of (I) the number of satellites in line of sight at said location, (ii) the sum of signal strengths of the or each satellite, and (iii) the dilution of precision value at said location.

12. A system as claimed in claim 10, wherein the predetermined mathematical function held in the data storage means is obtained by plotting for a plurality of reference locations the actual sky view factor against the satellite data corresponding to that to be received for the location whose sky view factor is to be determined, and fitting a curve through the plots, the mathematical function corresponding to the equation of the fitted curve.

13. A system as claimed in claim 12, additionally comprising a location classification database, and wherein the data storage means holds a pre-defined mathematical function for each location class, such that in use, the appropriate pre-determined mathematical function to be used for a location is determined by the database classification of that location.

14. A system as claimed in claim 13, wherein said classification database is created from a satellite image.

15. A system as claimed in claim 10, wherein the calculated sky view factor is stored on the data storage means, and a data bus is provided for transmitting the calculated sky view factor to an external system.

16. A system as claimed in claim 10, wherein the data receiving means is constituted by a standard GPS receiver unit and the data storage means and processor are constituted by a computer.

17. A system as claimed in claim 10, wherein the data receiving means, the data storage means and the processor are integrated into a single hand-held unit.

18. A system for predicting temperatures at locations along a survey route, said system comprising:
- (I) data storage means containing actual and forecast meteorological data, location specific geographical parameters and pre-defined energy balance equations,
- (ii) a system for determining the sky view factor at locations along the survey route in accordance with claim 10, and
- (iii) a processor for calculating the predicted temperature at each location on the survey route based on the meteorological data, sky view factor and location specific parameters input into the energy balance equations.

19. A system as claimed in claim 18, wherein said meteorological data held in the data storage means includes road surface temperature.

20. A system as claimed in claim 18, wherein said meteorological data held in said data storage means includes one or more of air temperature, dew-point, precipitation, cloud cover, cloud type and windspeed.

21. A system as claimed in claim 18, wherein said geographical parameters contained in said database are selected from latitude, longitude, altitude, an empirically derived cold air pooling index, sky view factor, screening, surface construction and landuse.

* * * * *